(12) United States Patent
Suda et al.

(10) Patent No.: US 8,707,887 B2
(45) Date of Patent: Apr. 29, 2014

(54) TEMPERATURE SENSING INDICATOR AND TEMPERATURE SENSING INDICATOR DEVICE

(75) Inventors: Hiroshi Suda, Saitama (JP); Tetsuya Nishimura, Tokyo (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 407 days.

(21) Appl. No.: 12/988,761

(22) PCT Filed: Feb. 16, 2009

(86) PCT No.: PCT/JP2009/000584
§ 371 (c)(1),
(2), (4) Date: Oct. 20, 2010

(87) PCT Pub. No.: WO2009/130831
PCT Pub. Date: Oct. 29, 2009

(65) Prior Publication Data
US 2011/0168079 A1 Jul. 14, 2011

(30) Foreign Application Priority Data

Apr. 24, 2008 (JP) ................................. 2008-114001

(51) Int. Cl.
*G01K 11/06* (2006.01)
*G01K 11/12* (2006.01)

(52) U.S. Cl.
USPC ............ 116/219; 116/216; 374/106; 374/162

(58) Field of Classification Search
USPC .......... 116/207, 216, 217, 218, 219; 374/106, 374/160, 162
See application file for complete search history.

(56) References Cited

U.S. PATENT DOCUMENTS

| | | | |
|---|---|---|---|
| 3,615,719 A | | 10/1971 | Michel et al. |
| 3,786,777 A | * | 1/1974 | Smith et al. .................... 116/206 |
| 3,996,007 A | * | 12/1976 | Fang et al. ..................... 422/401 |
| 4,195,058 A | * | 3/1980 | Patel ............................. 422/416 |

(Continued)

FOREIGN PATENT DOCUMENTS

| | | |
|---|---|---|
| JP | 49-40184 A | 4/1974 |
| JP | 57-29829 U | 2/1982 |

(Continued)

OTHER PUBLICATIONS

International Search Report, directed to PCT Application No. PCT/JP2009/000584, mailed on May 19, 2009, 2 pages.

*Primary Examiner* — R. A. Smith
(74) *Attorney, Agent, or Firm* — Orion Consulting, Ltd.; Joseph P. Farrar, Esq.

(57) ABSTRACT

A temperature sensing indicator provided with a capsule having a temperature sensing material contained that can be used without being affected by the temperature of fingers and allows the capsule to be easily broken. The temperature sensing indicator irreversibly indicates that a sensed temperature is not lower than a predetermined temperature or not higher than the predetermined temperature when a capsule containing a temperature sensing material is broken. The temperature sensing indicator has a body base made of a plastic material having a recess section formed therein; the capsule contained in the recess and containing the temperature sensing material, an absorbing member mounted on the upper part of the recess, and in which a through hole that exposes a portion of the upper surface of the absorbing member is formed. Pressing the display label crushes the recess in the body base to break the capsule.

8 Claims, 4 Drawing Sheets

(56) References Cited

U.S. PATENT DOCUMENTS

| | | |
|---|---|---|
| 4,793,717 A | 12/1988 | Manske |
| 5,120,137 A | 6/1992 | Ou-Yang |
| 5,368,905 A * | 11/1994 | Ohno .................... 428/34.1 |
| 5,964,181 A * | 10/1999 | Pereyra et al. ............ 116/216 |
| 6,042,264 A * | 3/2000 | Prusik et al. ............. 374/106 |
| 6,741,523 B1 * | 5/2004 | Bommarito et al. ........ 368/327 |
| 6,968,804 B1 | 11/2005 | Barbieri et al. |
| 7,232,253 B2 * | 6/2007 | Isbitsky et al. ............. 368/89 |
| 7,343,872 B2 * | 3/2008 | Taylor et al. ............. 116/216 |
| 7,984,687 B2 * | 7/2011 | Suda ....................... 116/219 |
| 8,430,053 B2 * | 4/2013 | Taylor et al. ............. 116/216 |
| 2003/0214997 A1 * | 11/2003 | Diekmann et al. ......... 374/102 |
| 2013/0220209 A1 * | 8/2013 | Rabinowitz et al. ........ 116/206 |

FOREIGN PATENT DOCUMENTS

| | | |
|---|---|---|
| JP | 2-28418 Y2 | 7/1990 |
| JP | 3-562 B2 | 1/1991 |
| JP | 2004-500555 A | 1/2004 |
| JP | 2007-121016 A | 5/2007 |

* cited by examiner (a)

(b)

(c)

TEMPERATURE SENSING INDICATOR AND TEMPERATURE SENSING INDICATOR DEVICE

TECHNICAL FIELD

The present invention relates to a temperature sensing indicator and a temperature sensing indicator device, which irreversibly show and leave a history indicating that a temperature has become equal to or higher than a prescribed temperature, or equal to or lower than a prescribed temperature, and more particularly, to a temperature sensing indicator and a temperature sensing indicator device whereby it is possible to visually check whether or not there has been exposure to an environment equal to or higher than a prescribed temperature or equal to or lower than a prescribed temperature.

BACKGROUND ART

In recent years, temperature management has become important in the quality management of products and manufactured articles. For example, if fresh goods such as fresh foods or cut flowers, medicines, and semiconductor materials are not subjected to sufficient temperature management and are exposed to a prescribed temperature or higher, then the quality of the product or goods declines or deteriorates, and furthermore, bacteria may proliferate and decomposition may occur.

Therefore, strict temperature management of products and manufactured articles of this kind must be carried out during transportation and conveyance, as well as during manufacture, and a temperature sensing indicator is used as one means of continuously monitoring temperature management of this kind.

The device described in Patent Reference 1 is proposed as a temperature sensing indicator of this kind. The temperature sensing indicator described in Patent Reference 1 is described here on the basis of FIG. 5 and FIG. 6. In these drawings, reference numeral 51 is a base body, and a wall section 51a which is ring-shaped in plan view is disposed on the upper surface of this base body 1. Moreover, a porous pad 52 is provided on the upper surface of the base body 51 on the inner side of the wall section 51a. This porous pad 52 is saturated with a solution of a dye and a chemical substance which remains in solid phase at or below a critical temperature, and which changes to liquid phase above the critical temperature.

Furthermore, an indicator core 53 is disposed on the upper end face of the wall section 51a. Moreover, the upper portion of the indicator core 53 and the outer circumferential surface of the wall section 51a is covered with a cap 54. This cap 54 has a convex shape, a so-called "dome" shape, and is formed in such a manner that when a prescribed external force is applied, the central portion thereof deforms and depressed into a concave shape. Furthermore, the indicator core 53 is gripped between the cap 54 and the wall section 51a, and the indicator core 53 is thereby held. Adhesive 55 is formed on the rear surface of the base body 51 and furthermore, a release liner 56 is provided so as to cover the adhesive 55.

In a temperature sensing indicator 50 having a composition of this kind, the release liner 56 is peeled away, the base body 51 is affixed to a product or manufactured article, whereupon the user pushes the central portion of the cap 54 in with his or her finger, and the indicator core 53 is thereby made to contact the porous pad 52.

When the product, or the like, to which this temperature sensing indicator 50 has been attached is exposed to a prescribed temperature or higher, then the dye in the porous pad 52 changes from solid to liquid phase, and the colored chemical substance moves from the porous pad 52 to the indicator core 53 due to the density gradient between the indicator core 53 and the porous pad 52. As a result of this, it is possible to judge that the product, or the like, in question has been exposed at least once to an atmosphere at the prescribed temperature or higher, by observing the colored state of the indicator core 53.

However, in a temperature sensing indicator of this kind, there is a risk that, regardless of the storage environment, the dye may change to liquid phase and evaporate with the passage of time, and the solvent of the chemical substance may evaporate, and furthermore, in storing the temperature sensing indicator, it is necessary to manage the temperature of the temperature sensing indicator itself.

Furthermore, in a temperature sensing indicator of this kind, the solvent of the chemical substance also evaporates after operation of the indicator, and hence there is a risk in that the history will be erased.

In order to resolve this, a temperature sensing indicator has been proposed in which a temperature sensing material is encased inside a capsule, as described in Patent Reference 2. This temperature sensing indicator is described here on the basis of FIG. 7 and FIG. 8.

In FIG. 7 and FIG. 8, the temperature sensing indicator 60 comprises a base body 61, a capsule 62, mounted on the base body 61, which encases a so-called colored wax, which is an oil-soluble coloring material, pigment or dye mixed into a straight-chain hydrocarbon or a solid solution consisting of a straight-chain hydrocarbon composition, and filter paper 63 provided so as to cover the capsule 62.

When this temperature sensing indicator 60 is used, the capsule 62 is crushed by being pressed from above the filter paper 63 by the user's finger. As a result of this, if the temperature reaches a prescribed temperature or higher, then the colored wax melts and the oil-soluble coloring material, pigment or dye seeps into the filter paper. Consequently, it can be judged from seeing the colored state of the filter paper 62 whether or not the product in question, or the like, has been exposed at any one time to an environment at the prescribed temperature or higher.

In the temperature sensing indicator 60 described in Patent Reference 2, a so-called colored wax, formed by mixing an oil-soluble coloring material, pigment or dye with a straight-chain hydrocarbon or a solid solution consisting of a hydrocarbon composition is encased inside a capsule and therefore evaporation can be suppressed and the indicator can be managed at normal temperature.

Patent Reference 1: Japanese Examined Patent Publication No. 3-562
Patent Reference 2: Japanese Utility Model Application Publication No. 57-29829

However, since the capsule is simply placed on a planar base body, then when the capsule is pressed by the user with his or her finger, for example, the capsule may become detached, or it may be difficult to break the capsule.

Furthermore, when the capsule is broken, the filter paper may become colored due to determining the temperature of the user's finger and hence there is a risk that the product may be mistakenly judged to have been exposed to an environment at the prescribed temperature or higher.

Moreover, there has also been a problem in that the colored wax evaporated after the capsule has been broken and the temperature sensing indicator has been operated.

DISCLOSURE OF THE INVENTION

The present invention was devised in view of these circumstances, an object thereof being to provide a temperature sensing indicator and a temperature sensing indicator device whereby the capsule can be broken readily when using a temperature sensing indicator comprising a capsule encasing a temperature sensing material. Furthermore, it is also an object of the present invention to provide a temperature sensing indicator and a temperature sensing indicator device whereby there is no occurrence of mistaken recognition that a product has been exposed to an environment of a prescribed temperature or higher, due to receiving the effects of the temperature of the user's finger when breaking the capsule of the temperature sensing indicator.

The present invention was devised in order to achieve the aforementioned objects, and the temperature sensing indicator relating to the present invention is a temperature sensing indicator which irreversibly indicates that a temperature is equal to or higher than a prescribed temperature or equal to or lower than a prescribed temperature when a capsule encasing a temperature sensing material is broken, the temperature sensing indicator including: a main body base made of a plastic material in which a recess section is formed; a capsule which is accommodated inside the recess section and in which the temperature sensing material is encased; an absorbing member disposed above the recess section; and a display label which covers the absorbing member and seals the capsule inside the recess section, and in which a through hole that exposes a portion of the upper surface of the absorbing member is formed; and a transparent sheet made of a plastic material which covers the upper surface of the display label.

In this way, in the temperature sensing indicator relating to the present invention, since the capsule is sealed inside a recess section of a main body base made of a plastic material, the recess section is readily crushed by pressing and the capsule can be broken readily without becoming detached.

Furthermore, desirably, a transparent sheet made of a plastic material which covers the upper surface of the display label is provided.

By covering the upper surface of the display label with a transparent sheet (for example, a laminate seal) made of plastic material in this way, it is possible to protect the temperature sensing material that has been absorbed into the absorbing member from ultraviolet light, color fading, drying, evaporation, and the like.

Furthermore, it is possible to prevent infiltration of water into the absorbing member from the exterior, and it is possible to prevent condensation inside the absorbing member at low temperature.

Desirably, one end portion of the absorbing member is disposed above the recess section which accommodates the capsule, and the through hole of the display label is formed in an outward radial direction of the display label, except for above the recess section. It is also possible for the absorbing member to be formed in a long and thin shape, with one end portion of the absorbing member being disposed above the recess section which accommodates the capsule, and the through hole of the display label being formed in the lengthwise direction of the absorbing member, except for above the recess section. Moreover, desirably, the through hole in the display label is formed in a plurality at prescribed distances.

With an absorbing member of this kind, it is possible to confirm the colored state of the absorbing member via the through hole, and therefore it is possible to identify readily the time period of exposure to the prescribed temperature and higher or the prescribed temperature and lower, on the basis of the distance of the colored portion from the position where the capsule is situated (if a plurality of through holes are arranged, then on the basis of the positions of the colored through holes).

Moreover, even if the temperature sensing material melts at a temperature below the prescribed temperature and the portion above the recess section where the capsule is accommodated becomes colored, since the display aperture of the display label is distanced from the recess section, then the coloration of the absorbing member is not visible through the display aperture and it is possible to prevent mistaken recognition that the product has been exposed to an environment at the prescribed temperature or higher.

Furthermore, desirably, the temperature sensing material is a chemical substance (such as a gel) which becomes liquid at a prescribed temperature or higher or at a prescribed temperature or lower.

A temperature sensing indicator which uses a chemical substance that becomes liquid at a prescribed temperature or lower in this way can be used suitably with products and manufactured articles whose quality deteriorates upon freezing, such as lettuces, potatoes, tofu, carbonated drinks (beer), and the like.

Furthermore, desirably, a viscosity enhancer is mixed into the temperature sensing material, in which case it is possible to suppress variation in the permeation into the absorbing member of the temperature sensing material that has become liquid, in response to variation in the ambient temperature.

Furthermore, desirably, the temperature sensing material or the capsule is an organic substance having a prescribed color or is applied with a prescribed color, and by setting the color applied for each type of temperature sensing material (the setting temperature and setting line-up), it is possible to identify readily by visual inspection the temperature of the product at which the temperature sensing material has been operated. Furthermore, by enabling easy identification in this way, it is possible to prevent incorrect assembly, not only by consumers, but also by operating staff in a manufacturing process.

If a color is applied to the capsule, then either a coloring material can be coated thereon after forming the capsule, or alternatively, a colored powder can be added to the material when forming the capsule. Furthermore, it is also possible to adopt a dual structure for the capsule and to apply a color only to the outer side capsule (the wall or film).

Furthermore, in order to achieve the aforementioned object, the temperature sensing indicator according to the present invention has: a temperature sensing indicator, and a case which accommodates the temperature sensing indicator; wherein the case comprises: a plate-shaped base body on which the temperature sensing indicator is placed; a cover which covers the temperature sensing indicator placed on the base body; and pressing means for pressing the temperature sensing indicator, the pressing means being formed in the cover or provided as a separate body, and the temperature sensing indicator is pressed by the pressing means whereby the capsule is broken.

In this way, in the temperature sensing indicator device relating to the present invention, since the capsule is broken by pressing the capsule by the pressing means, then it is possible to reduce the effects of the temperature of the finger performing the pressing action when breaking the capsule.

Furthermore, since the capsule is sealed inside the recess section of the main body base made of plastic material and the pressing section is situated directly above the recess section, then a strong pressing force is applied to the recess section via the display panel and the absorbing member. Therefore, the recess section is crushed easily and it is possible to break the capsule reliably without the capsule becoming detached.

Furthermore, desirably, the pressing means is a downwardly projecting pressing section formed in the central portion of the cover which is formed in a depressible convex dome shape; and the capsule is broken by depressing the cover and pressing the capsule by means of the pressing section.

In this way, it is possible to reduce the number of components and to achieve inexpensive manufacture while insulating the heat of the user's finger, by forming pressing means on the cover.

Furthermore, desirably, one or a plurality of projecting sections which project toward the internal space of the cover are formed, the projecting section(s) being formed in the cover which covers the temperature sensing indicator or provided as a separate body; and the projecting section engages with the temperature sensing indicator, whereby the temperature sensing indicator is held inside the case.

By holding the temperature sensing indicator with a projecting section which is formed in the cover or is provided as a separate body in this way, it is possible to prevent positional displacement of the recess section in which the capsule is sealed, due to bending of the temperature sensing indicator when the temperature sensing indicator is pressed by the pressing means, or the like.

According to the temperature sensing indicator relating to the present invention, it is possible to break the capsule readily when using a temperature sensing indicator comprising a capsule in which a temperature sensing material is encased, and furthermore, it is also possible to avoid mistaken recognition that the product in question has been exposed to an environment at the prescribed temperature or higher, due to the effects of the temperature of the user's finger when breaking the capsule.

BEST MODE FOR CARRYING OUT THE INVENTION

Below, one embodiment of the present invention is described with respect to FIG. 1 to FIG. 3. FIG. 1 is an exploded perspective diagram showing a temperature sensing indicator device relating to one embodiment of the present invention, FIG. 2 is a cross-sectional diagram showing a state before activation of the temperature sensing indicator device shown in FIG. 1, and FIG. 3 is a cross-sectional diagram showing a state after activation of the temperature sensing indicator device in FIG. 1.

As shown in FIG. 1, this temperature sensing indicator device 1 has a circular disk-shaped (plate-shaped) base body 2 forming a platform, a temperature sensing indicator 3 which is mounted on the upper portion of the base body 2, and a cover 9 made of a transparent synthetic resin (for example, PET (polyethylene terephthalate)) which is formed in a hat (a brimmed hat) shape in order to cover the whole of the temperature sensing indicator 3 from above, the edge portions (horizontal portions) of which are bonded to the edge portions of the base body 2 (by ultrasonic welding, for example). In other words, the base body 2 and the cover function as a case for the temperature sensing indicator 3. By being covered by the cover 9, the temperature sensing indicator 3 is located in position at least in the lateral direction with respect to the cover 9 as shown in FIG. 2.

In order to attach the temperature sensing indicator device 1 securely to a product or manufactured article, it is desirable to form an adhesive or sticky material on the rear surface of the base body 2 which forms a platform. In this, it is desirable to provide a separating paper (not illustrated) on the adhesive or sticky material in such a manner that the separating paper is peeled away when the device is to be used.

The temperature sensing indicator 3 comprises: a main base 4 made of a plastic material (for example, a PET film) having a recess section 4a formed in the central portion thereof; a capsule 5, accommodated inside the recess section 4a, inside which a temperature sensing material is encased; a long thin-shaped absorbing member 6 disposed on top of the recess section 4a; and a display label 7 which covers the absorbing member 6 and seals the capsule 5 inside the recess section 4a and in which a plurality of display apertures 7a (through holes) that expose a portion of the upper surface of the absorbing member 6 are formed.

Moreover, a thin transparent sheet 8 (for example, a laminate seal) made of a plastic material which covers the upper surface of the display label 7 is attached to the display label 7.

By covering the upper surface of the display label 7 with this transparent sheet 8, it is possible to protect the absorbing member 6, and the temperature sensing material which has been absorbed into the absorbing member 6 can be protected from color fading, drying, evaporation, or the like.

Furthermore, it is possible to prevent infiltration of water into the absorbing member 6 from the exterior, and the occurrence of condensation inside the absorbing member 6 at low temperatures can be prevented.

The temperature sensing indicator 3 can be used independently, but by using a case consisting of a base body 2 and a cover 9, then it is possible to break the capsule which encases the temperature sensing material more readily, and it is also possible reliably to prevent melting of the temperature sensing material due to the temperature of the user's finger.

Furthermore, if the temperature sensing indicator 3 is used independently without being covered by the cover 9, then it is desirable that the adhesive or sticky material be formed on the lower surface of the main body base 4. In this case, desirably, a separating paper (not illustrated) is provided on the adhesive or sticky material, in such a manner that the separating paper is peeled away when the indicator is to be used.

To describe the temperature sensing indicator 3 in more detail, the main body base 4 is formed in a circular shape in plan view, and by forming a recess section 4a for accommodating the capsule 5 in the center of the main body base 4, a circular ring-shaped horizontal section 4b is formed in the perimeter thereof.

As shown in the drawings, the absorbing member 6 which is formed in a long thin shape is mounted on top of the horizontal section 4b along the radial direction of the main body base 4, in such a manner that one end portion thereof is positioned over the capsule 5. By bonding the horizontal section 4b of the main body base 4 with the lower surface of the display label 7, the absorbing member 6 is gripped in a sandwiched state and detachment or positional displacement of the absorbing member 6 is prevented, as well as sealing the capsule 5 inside the recess section 4a.

In this case, a composition is adopted whereby the upper surface of the absorbing member 6 is exposed via the plurality of (in the drawing, three) display apertures 7a which are provided at prescribed distances in the radial direction of the display label 7 (in other words, the lengthwise direction of the absorbing member 6).

In the present embodiment, a case where a plurality of display apertures 7a are provided is described as a desirable example, but in the temperature sensing indicator of the present invention, the display aperture may also be one through hole formed in a long and thin shape following the absorbing member 6, instead of the plurality of display apertures 7a described above.

Furthermore, the display apertures 7a are not provided above the recess section 4a, as shown in FIG. 2. By adopting a composition of this kind, when the capsule is broken, even if the temperature sensing material melts at a temperature below the prescribed temperature and the one end portion of the absorbing member 6 (the portion which covers the recess section 4a) becomes colored, the coloration of the absorbing member 6 is not visible through the display apertures 7a and therefore mistaken recognition can be prevented.

Furthermore, a warning notice, or the like, is provided on the upper surface of the display label 7 stating that if the portion (of the absorbing member 4) which is visible though the display aperture 7a has become colored (developed color), then the device has been placed in an environment at or above the prescribed temperature.

Furthermore, desirably, the capsule 5 or the temperature sensing material encased therein is a material having a prescribed color or a material to which a prescribed color is imparted. For example, by setting the color applied separately for each type of temperature sensing material (the setting temperature, the setting line-up), then it is possible to identify, readily by visual inspection, the temperature of the product at which the capsule 5 or the temperature sensing material has been operated. Furthermore, by enabling easy identification, it is possible to prevent mistaken assembly by the operator in the manufacturing process, as well as by the consumer.

If a color is applied to the capsule 5, then either a coloring material is coated thereon after forming the capsule, or a coloring powder is added to the materials during the formation of the capsule. Furthermore, it is also possible to adopt a dual structure for the capsule and to apply a color only to the outer side capsule (the wall or film).

Moreover, the temperature sensing material encased inside the capsule 5 may employ a so-called colored wax, for example, which is a oil-soluble coloring material, pigment or dye combined with a straight-chain hydrocarbon or a mixed material consisting of a straight-chain hydrocarbon composition. Desirably, the colored wax is mixed with a viscosity enhancer, in which case it is possible to suppress variation in the permeation of the wax into the absorbing member 6 upon becoming liquid. For the viscosity enhancer, it is possible to use, for example, Septone (registered trademark) which has good miscibility with wax.

Furthermore, for the temperature sensing material, it is also possible to employ a chemical substance which melts or changes color at the prescribed temperature, rather than dissolving in water. In the description given below, a colored wax is used as an example of the temperature sensing material.

Moreover, for the absorbing member 6, it is possible to use any conventionally employed material provided that it is capable of absorbing the temperature sensing material, such as filter paper, a porous member (film, sponge, etc.), silica gel, or the like.

Furthermore, the cover 9 comprises a projecting section 9a formed in a hat shape as described above which covers the whole of the temperature sensing indicator 3, and a circular ring-shaped horizontal section 9b which is formed about the perimeter thereof.

To give a more detailed description of the projecting section 9a, the projecting section 9a comprises an upright section 9c which stands up substantially perpendicularly from the horizontal section 9b, a shoulder section 9d having a circular arc-shaped cross-section which is formed on the top of the upright section 9c, a so-called "dome" shaped inclined surface section 9e which rises toward the central portion from the shoulder section 9d, and a pressing section 9f (pressing means) provided so as to project downwards in the center of the inclined surface section 9e.

The inclined surface section 9e is formed in such a manner that it deforms and depresses into a concave shape from a convex shape as shown in FIG. 3 when an external force acts thereon from above. A connecting hole (not illustrated) for allowing air to escape from the accommodating space of the temperature sensing indicator 3 is provided in the junction between the horizontal section 9b of the cover 9 and the edge portion of the base body 2, whereby the inclined surface section 9e does not returns to its original state after deforming and depressing into a concave shape. Moreover, the connecting hole is formed to a diameter which does not allow infiltration of water.

Furthermore, by providing a pressing section 9f on the deformable and depressible inclined surface section 9e, it is possible to impart a snapping effect when the pressing section 9f is pressed by the user with his or her finger, and it is also possible to press and break the capsule 5 reliably by means of the reactive force of the inclined surface section 9e.

Moreover, by forming the pressing section 9f on the cover 9 as described above, the number of components can be reduced and inexpensive manufacturing process can be achieved.

Furthermore, although the temperature sensing indicator 3 is covered by the recess section 9a by placing the cover 9 on the temperature sensing indicator 3, the temperature sensing indicator 3 is located in position by means of the outer perimeter section of the temperature sensing indicator 3 engaging the inner circumferential surface of the upright section 9c, in such a manner that the pressing section 9f of the cover 9 is positioned over the central portion of the display label 7.

Moreover, one or a plurality of (in the drawings, three) projecting portions 9g which project toward the accommodating space (the space inside the cover 9) of the temperature sensing indicator 3 are formed in the shoulder section 9d of the cover 9, and the projecting section 9g engages with the upper surface of the temperature sensing indicator 3 and the temperature sensing indicator 3 is held inside the cover 9.

By holding the temperature sensing indicator 3 by means of the projecting section 9g in this way, it is possible to prevent positional displacement of the recess section 4a in which the capsule 5 is sealed due to bending of the temperature sensing indicator 3, or the like, when the temperature sensing indicator 3 is pressed by means of the pressing section 9f.

Here, the central portion of the display label 7 is in a position directly above the recess section 4a of the main body base 4, and therefore when the user pushes in the pressing section 9f of the cover 9 downwards with his or her finger, then the central portion of the display label 7 is pushed in downwards as shown in FIG. 3, the recess section 4a which is made of a plastic material is crushed readily, and the capsule 5 is broken.

Furthermore, the cover 9 is made of a transparent member, in such a manner that the state of coloration (color development) of the absorbing member 6 can be perceived readily from above via the display apertures 7a.

The temperature sensing indicator device 1 which is composed in this way is stored in the state shown in FIG. 2. In this case, the colored wax is covered by the capsule 5, and therefore even if exposed to an environment at the prescribed temperature or higher, evaporation of the colored wax is suppressed, and permeation of the wax into the absorbing member 6 is avoided, thus enabling long-term storage and conveyance at normal temperature, as well as suppressing product defects caused by incorrect operation.

When installing the temperature sensing indicator device 1, as shown in FIG. 3, the user presses the pressing section 9f from the upper side of the cover 9, with his or her finger, thereby deforming the inclined surface section 9e into a concave shape, and the pressing section 9f is moved downwards.

Due to the downward movement of the pressing section 9f, the temperature sensing indicator 3 is pressed against the base body 2, the main body base 4a is crushed, the capsule 5 breaks, and the indicator assumes an activated state.

In this operation for setting the indicator to an activated state, since the capsule 5 is sealed inside the recess section 4a of the main body base 4 which is made of a plastic material and the pressing section 9f is situated directly above the recess section 4a, then a strong pressing force is applied to the recess section 4a via the display label 7 and the absorbing member 6. Therefore, the recess section 4a is crushed readily and the capsule 5 can be broken reliably, without becoming detached.

Furthermore, in this operation for setting the indicator to an activated state, since the pressing section 9f has a shape which projects downwards from the center of the inclined surface section 9e of the cover 9 and is made of a heat insulating member, then transmission of the heat of the user's finger to the colored wax is prevented.

Even in cases where the temperature sensing indicator 3 is used (activated) directly on a product without using a cover 9, if the colored wax melts to some extent at a temperature below the prescribed temperature, the fact that the display apertures 7a of the display label 7 are distanced from the recess section 4a where the capsule 5 is accommodated means that the resulting coloration is not visible through the display apertures 7a and therefore incorrect recognition can be prevented.

If the product or the prescribed atmosphere where the temperature sensing indicator device 1 is situated is exposed to an environment at the prescribed temperature or higher, then the colored wax melts and is absorbed by the absorbing member 6 (the permeated portion 6a in FIG. 4(a)).

As the permeation of the colored wax into the absorbing member 6 progresses, the state of coloration (the state of color development) can be perceived from above the cover 9, through the transparent cover 9, the transparent sheet 8, and the display apertures 7a of the display label 7 (the permeated portion 6a in FIG. 4(b)). By this means, it is possible to judge whether or not the product in question has been exposed even once to an environment at the prescribed temperature or higher.

Furthermore, since the absorbing member 6 has a long thin shape and a plurality of display apertures 7a are formed along the lengthwise direction thereof, then with the passage of time, the state of coloration changes successively, starting from the display aperture 7a nearest to the position of the capsule 5 (the permeated portion 6a in FIG. 4(c)). More specifically, if the temperature has fallen below the prescribed temperature after exposure to the prescribed temperature or higher, then the colored wax starts to solidify and the permeation thereof ceases. Therefore, it is possible readily to identify the time period during which the indicator has been exposed to an environment at the prescribed temperature or higher, by looking at the state of coloration in the respective display apertures 7a.

Furthermore, if the temperature has repeated a plurality of cycles of falling below the prescribed temperature after exposure to the prescribed temperature or higher, then the colored wax accordingly repeats actions of permeating and ceasing to permeate into the absorbing member 6, on each occasion, and therefore it is also possible to tell the accumulated time of exposure to the prescribed time.

In the embodiment described above, a case was described in which a so-called "colored wax" is encased in the capsule, the colored wax being an oil-soluble coloring material, pigment or dye combined with a straight-chain hydrocarbon or a solid solution consisting of a straight-chain hydrocarbon composition, but for the temperature sensing material, apart from the aforementioned colored wax which becomes liquid at a prescribed temperature or higher, it is also possible to use a colored gel which become liquid at a prescribed temperature or below (product name: Slide-Ring Gel manufactured by Advanced Soft Materials, Co., Ltd.).

In this way, a temperature sensing indicator which uses a colored gel that becomes liquid at a prescribed temperature or below can be used suitably with products and manufactured articles whose quality deteriorates upon freezing, for instance, lettuces, potatoes, tofu, carbonated drinks (beer), and the like.

Furthermore, in the present embodiment, the cover 9 is a transparent synthetic resin, but by forming the cover 9 from a synthetic resin having properties whereby the resin clouds or whitens at a prescribed temperature or higher, such as A-PET (amorphous PET), for example, it is also possible to use the actual cover 9 itself as a temperature sensing indicator.

In this case, since the cover 9 becomes clouded if the ambient temperature in which the A temperature sensing indicator device 1 is disposed has become a prescribed temperature or higher, then it is possible to carry out two temperature management operations, including temperature management by the temperature sensing indicator 3.

Furthermore, in the embodiment described above, the absorbing member 6 is described as being formed in a long and thin shape, but the absorbing member is not limited to having a long and thin shape in the temperature sensing indicator relating to the present invention. In other words, it is sufficient that one end portion of the absorbing member 6 is disposed above the recess section 4a which accommodates the capsule 5, and that a through hole of the display label 7 is formed in the outward radial direction of the display label 7, except for the portion above the recess section 4a. For example, for the absorbing member 6 formed in this way, it is possible to use a member formed in a spiral shape, in which case the central portion of the absorbing member is disposed above the recess section 4a which accommodates the capsule 5.

INDUSTRIAL APPLICABILITY

The temperature sensing indicator relating to the present invention is suitable for use in the field of the manufacture, distribution and storage of products and manufactured articles which require temperature management, such as fresh foods, chilled foods, cut flowers, medicines, semiconductor materials, and the like.

EXPLANATION OF REFERENCE NUMERALS

Figure 1:
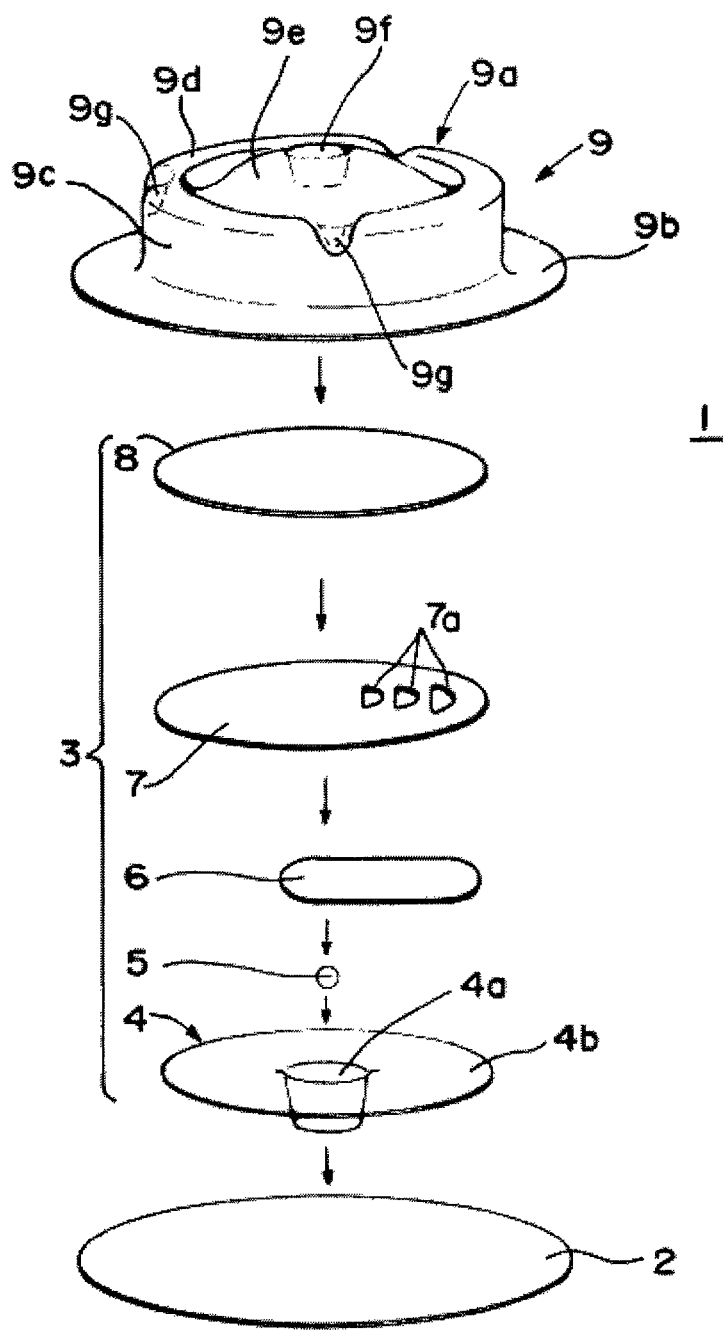
FIG. 1 is an exploded perspective diagram showing a temperature sensing indicator device relating to one embodiment of the present invention.
Figure 2:
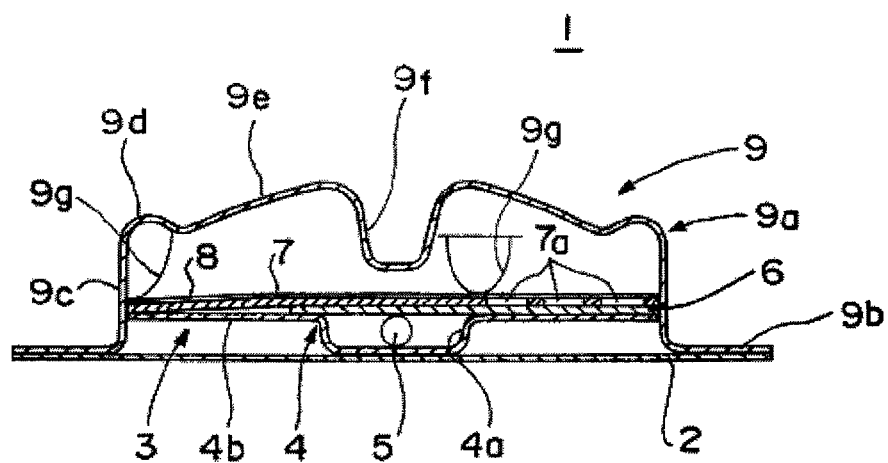
FIG. 2 is a cross-sectional diagram showing a state of the temperature sensing indicator device shown in FIG. 1, before activation.
Figure 3:
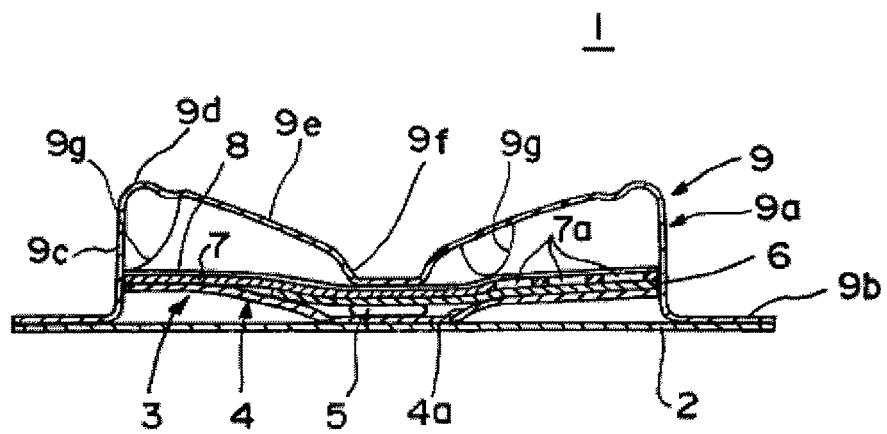
FIG. 3 is a cross-sectional diagram showing a state of the temperature sensing indicator device shown in FIG. 1, after activation.
Figure 4:
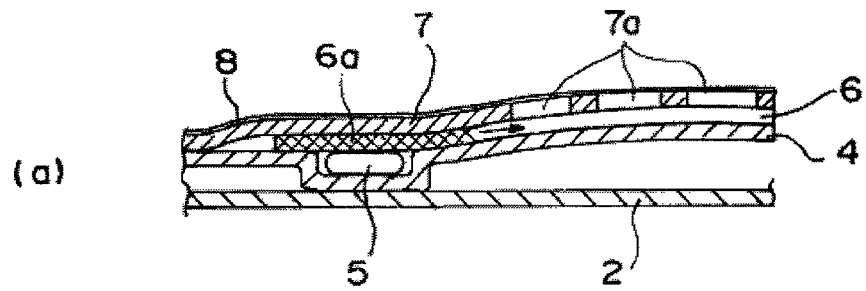
FIGS. 4(a), 4(b), 4(c) are cross-sectional diagrams showing a state of permeation of a colored wax into an absorbing member, in the temperature sensing indicator device after activation shown in FIG. 3.
Figure 4:
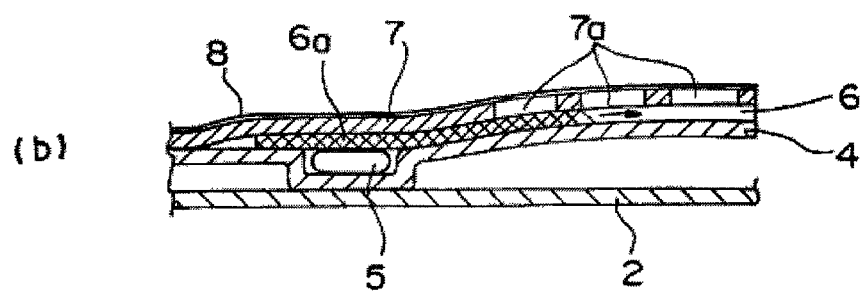
Figure 4:
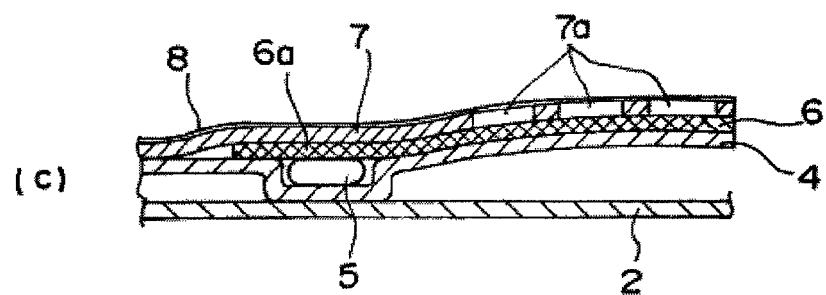
Figure 5:
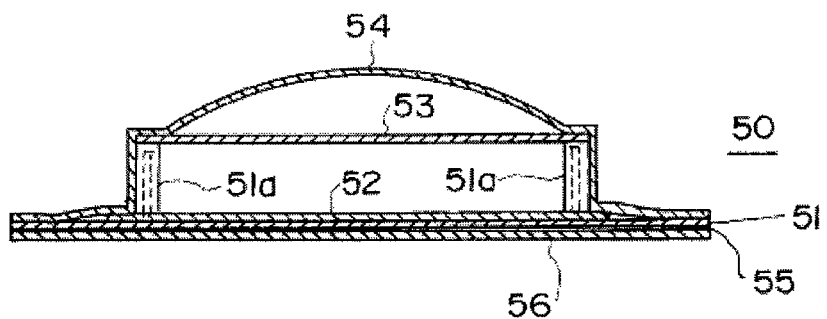
FIG. 5 is a cross-sectional diagram showing a conventional temperature sensing indicator.
Figure 6:
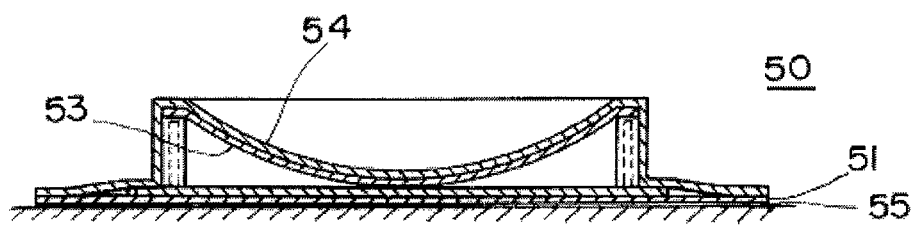
FIG. 6 is a cross-sectional diagram showing a state of the temperature sensing indicator shown in FIG. 5, before activation.
Figure 7:
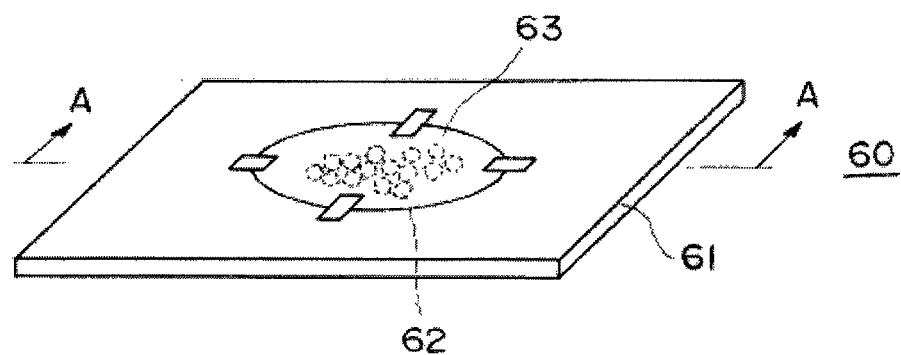
FIG. 7 is a perspective diagram showing a further conventional temperature sensing indicator.
Figure 8:
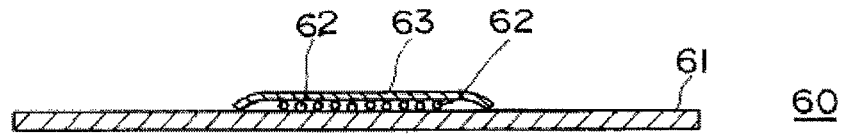
FIG. 8 is a cross-sectional diagram showing a temperature sensing indicator shown in FIG. 7.

1 temperature sensing indicator device
2 base body
3 temperature sensing indicator
4 main body base
4*a* recess section
4*b* horizontal section
5 capsule
6 absorbing member
6*a* permeated portion
7 display label
7*a* display aperture (through hole)
8 transparent sheet
9 cover
9*a* projecting section
9*b* horizontal section
9*c* upright section
9*d* shoulder section
9*e* inclined surface section
9*f* pressing section (pressing means)
9*g* projecting portion

The invention claimed is:

1. A case which accommodates a temperature sensing indicator device including a temperature sensing indicator which irreversibly indicates that a temperature is equal to or higher than a prescribed temperature or equal to or lower than a prescribed temperature when a capsule encasing a temperature sensing material is broken, comprising:
the temperature sensing indicator comprising:
a main body base made of a plastic material in which a recess section is formed;
a capsule which is accommodated inside the recess section and in which the temperature sensing material is encased;
an absorbing member disposed above the recess section; and
a display label which covers the absorbing member and seals the capsule inside the recess section, and in which a through hole that exposes a portion of the upper surface of the absorbing member is formed,
wherein by pressing the display label the recess section of the main body base is crushed and the capsule is broken;
wherein a plate-shaped base body on which the temperature sensing indicator is placed; a cover which covers the temperature sensing indicator placed on the base body; and a pressing section for pressing the temperature sensing indicator, the pressing section being formed in the cover, the pressing section is a downwardly projecting pressing section formed in a central portion of the cover which is formd in a depressible convex dome shape; and
wherein the capsule is broken by depressing the cover and pressing the capsule by the pressing section.

2. The temperature sensing indicator according to claim 1, wherein a transparent sheet made of a plastic material covers the upper surface of the display label.

3. The temperature sensing indicator according to claim 1, wherein one end portion of the absorbing member is disposed above the recess section which accommodates the capsule, and the through hole of the display label is formed in an outward radial direction of the display label, except for the recess section.

4. The temperature sensing indicator according to claim 1, wherein the temperature sensing material is a chemical substance which becomes liquid at least at a prescribed temperature.

5. The temperature sensing indicator according to claim 1, wherein at least one of the temperature sensing material and the capsule is colored with a prescribed color.

6. The temperature sensing indicator device according to claim 1, further comprising:
at least one projecting section which projects toward the internal space of the cover and is formed in the cover which covers the temperature sensing indicator or is provided as a separate body, wherein
the at least one projecting section engages with the temperature sensing indicator, and the temperature sensing indicator is held inside the case.

7. A temperature sensing indicator which irreversibly indicates that a temperature is equal to or higher than a prescribed temperature or equal to or lower than a prescribed temperature when a capsule encasing a temperature sensing material is broken, the temperature sensing indicator comprising:
a main body base made of a plastic material in which a recess section is formed;
a capsule which is accommodated inside the recess section and in which the temperature sensing material is encased, the temperature sensing material is mixed with a viscosity enhancer;
an absorbing member disposed above the recess section; and
a display label which covers the absorbing member and seals the capsule inside the recess section, and in which a through hole that exposes a portion of the upper surface of the absorbing member is formed, wherein
by pressing the display label the recess section of the main body base is crushed and the capsule is broken;
the temperature sensing indicator device further comprising:
at least one projecting section which projects toward the internal space of the cover and is formed in the cover which covers the temperature sensing indicator or is provided as a separate body, wherein
the at least one projecting section engages with the temperature sensing indicator, and the temperature sensing indicator is held inside the case.

8. A temperature sensing indicator which irreversibly indicates that a temperature is equal to or higher than a prescribed temperature or equal to or lower than a prescribed temperature when a capsule encasing a temperature sensing material is broken, the temperature sensing indicator, comprising:
a main body base made of a plastic material in which a recess section is formed;
a capsule which is accommodated inside the recess section and in which the temperature sensing material is encased;
an absorbing member disposed above the recess section; and
a display label which covers the absorbing member and seals the capsule inside the recess section, and in which a through hole that exposes a portion of the upper surface of the absorbing member is formed, wherein by pressing the display label the recess section of the main body base is crushed and the capsule is broken; and the temperature sensing indicator further comprising at least one projecting section which projects toward the internal space of the cover and is formed in the cover which covers the temperature sensing indicator or is provided as a separate body, wherein the at least one projecting section engages with the temperature sensing indicator, and the temperature sensing indicator is held inside the case.

* * * * *